United States Patent [19]

Lotz

[11] Patent Number: 4,610,433
[45] Date of Patent: Sep. 9, 1986

[54] TORCH-CUTTING MACHINE FOR THERMALLY CUTTING ELONGATE MEMBERS

[75] Inventor: Horst K. Lotz, Wiesbaden-Delkenheim, Fed. Rep. of Germany

[73] Assignee: Aute Gesellschaft fuer autogene Technik mbH, Forch, Switzerland

[21] Appl. No.: 722,443

[22] Filed: Apr. 12, 1985

[30] Foreign Application Priority Data

Apr. 24, 1984 [DE] Fed. Rep. of Germany ... 8412636[U]

[51] Int. Cl.$^4$ ............................................. B23K 7/00
[52] U.S. Cl. ...................................... 266/50; 266/67; 266/68; 266/73
[58] Field of Search ...................... 266/50, 67, 68, 73

[56] References Cited

U.S. PATENT DOCUMENTS 4,235,422 11/1980 Schmunck et al. .................. 266/50
4,261,552 4/1981 Kameyama et al. .................. 266/50
4,393,296 7/1983 Dompas ................................ 266/50

Primary Examiner—Wayland Stallard
Attorney, Agent, or Firm—Gifford, Groh, VanOphem, Sheridan, Sprinkle & Dolgorukov

[57] ABSTRACT

In a torch cutting machine for thermally cutting hot elongate members which are conveyed horizontally at a varying speed or with a varying direction of movement, a torch-carrying carriage is movable parallel to and with the elongate member during the cutting operation, by virtue of a clamping means engaging the elongate member. A protective hood is disposed in the direct vicinity of the elongate member, beneath the machine, for the purposes of protecting it from heat and radiation. The hood moves synchronously with the machine or elongate member in the cutting operation, and the hood has apertures through which the torch and the clamping means extend.

13 Claims, 4 Drawing Figures

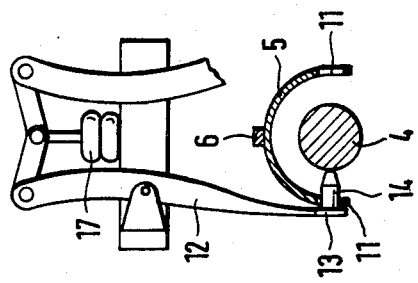
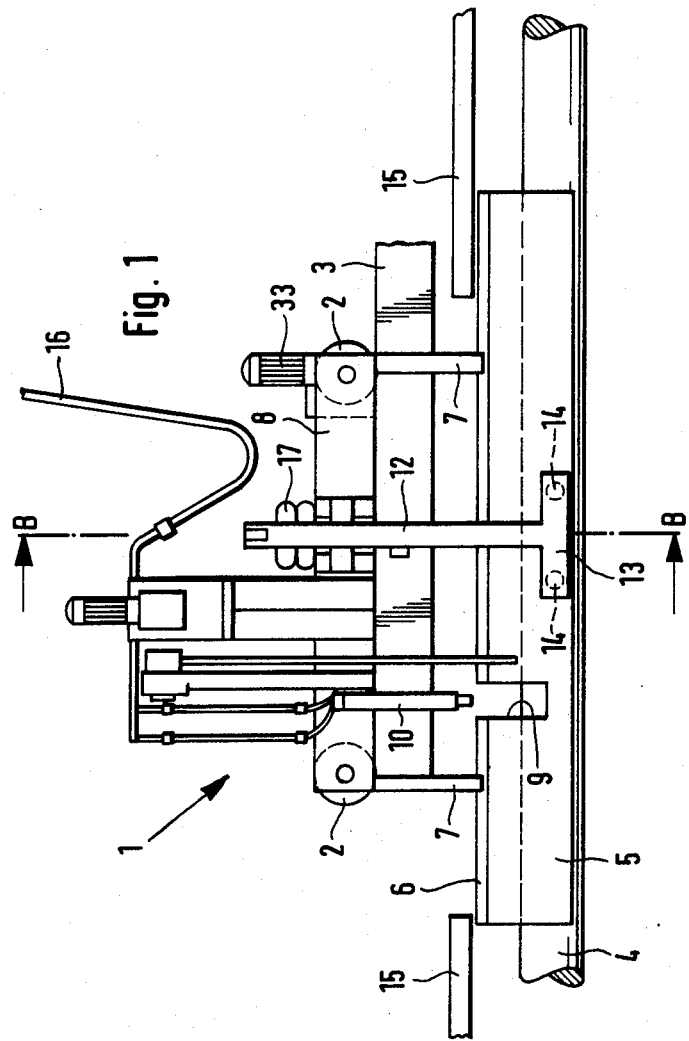

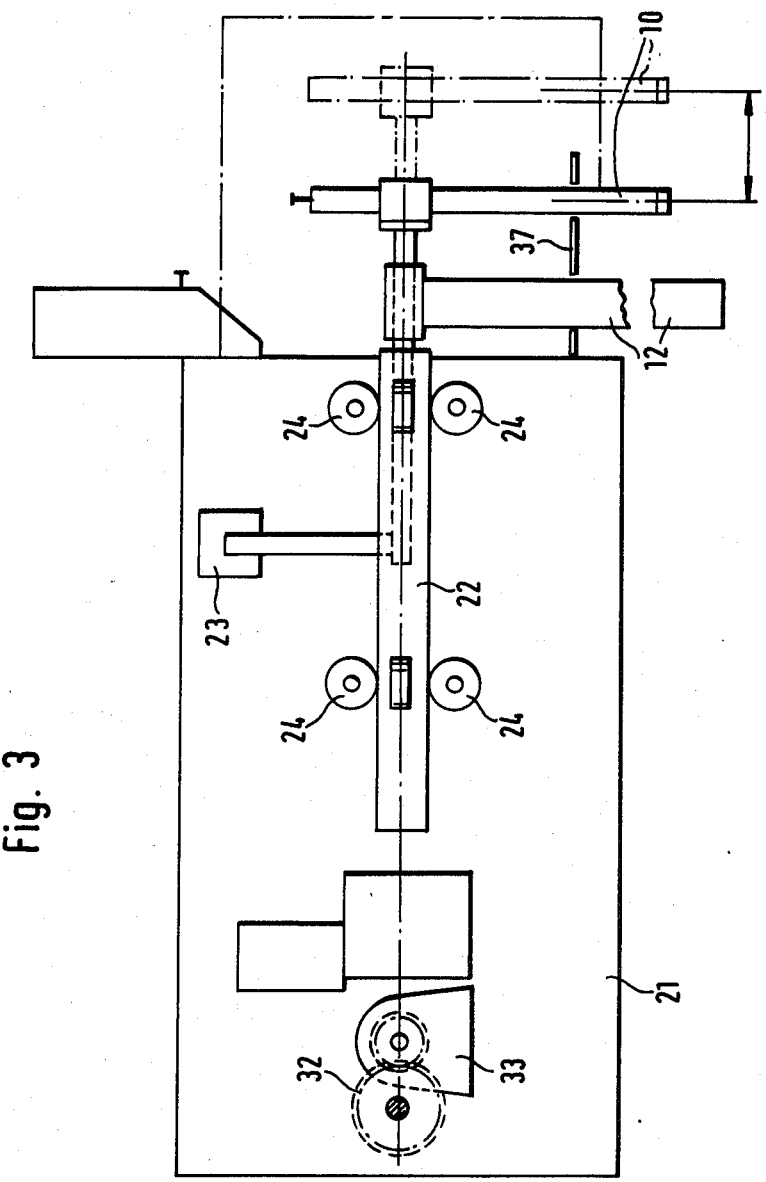

TORCH-CUTTING MACHINE FOR THERMALLY CUTTING ELONGATE MEMBERS

FIELD OF THE INVENTION

The invention relates to a torch cutting machine for thermally cutting hot elongate members which bend easily and which are conveyed horizontally at a rising and falling speed or with a varying direction of movement, comprising a torch carriage which is movable on a track parallel to the elongate member and whose movement with the elongate member during the cutting operation is ensured by a clamping means which engages the elongate member.

PRIOR ART

In machines of that kind, difficulties are encountered in adapting a torch cutting machine for cutting elongate members or billets or bars, to the varying movements thereof, that is to say, ensuring synchronous operation thereof, in which respect the problem which occurs is in particular that the torch cutting machine with its operating units must be protected from the substantial amount of heat radiated from the elongate member, by cooling means or in some other fashion. That causes the weight of the machine to be increased and thus gives rise to further difficulties in regard to adapting the movement of the torch cutting machine to the elongate member, because of the substantial weights to be moved.

SUMMARY OF THE PRESENT INVENTION

The invention is therefore based on the object of providing a torch cutting machine of the kind set forth above, wherein there are no problems in regard to protection from heat and radiation and which can be adapted to varying speeds and directions of movement of the elongate member.

The invention provides that for the purposes of protection against heat and radiation with respect to the torch cutting machine, a protective hood having an insulating effect is disposed in the direct vicinity of the elongate member beneath the torch cutting machine, the hood covering or partially enclosing the elongate member, that the protective hood moves synchronously with the torch cutting machine or the elongate member and that apertures are provided in the protective hood through which the torch and the clamping means extend.

The protective hood is advantageously fixed to the torch cutting machine and hangs down therefrom, as far as the elongate member.

Desirably, it may be provided that a separate drive means moves the protective hood synchronously with respect to the torch.

In order to permit the elongate member to be kept hot, a further development of the invention provides that the protective hood is movable in overlapping relationship therewith between heat retaining hoods disposed at the front and rear ends of the torch cutting section. In that arrangement, the protective hood may advantageously be flat, half-round or U-shaped.

In another embodiment, the invention proposes that the protective hood is provided with insulating material and has heat reflecting properties, and also has a cooling effect by virtue of radiation or by coolant from the outside.

An embodiment of the invention provides that the torch cutting machine, of a lightweight construction, comprises a machine housing which is not insulated and which is not water-cooled, and is formed as a light machine frame structure with clamping and cutting means.

An advantageous development of the invention provides that the torch cutting machine has a clamping and cutting frame structure which is displaceable on a main frame structure and which, of low mass or weight, carries the cutting torch and a clamping means.

In accordance with an advantageous embodiment, provided for the main frame structure is a drive means which, being switched by way of limit sensing switches, causes the main frame to follow, on the burner track, a clamping and cutting frame structure which is mounted on the torch carriage and which is connected to the elongate member.

In the event that the drive means for the main frame structure fails, it is provided that the clamping and cutting frame structure also moves the torch carriage, by way of an entrainment means. In order to prevent the torch cutting machine from tilting or tipping, it is provided that each clamping lever comes to bear against the elongate member by way of two contact points at each side.

Further advantageous features provide that the lower part of the torch which extends through the protective hood is water-cooled and that the clamping levers are operable by means of a bellows-type cylinder.

BRIEF DESCRIPTION OF THE DRAWINGS

The invention will now be described in greater detail by means of embodiments with reference to the accompanying drawings in which:

FIG. 1 shows a side view of a torch cutting machine,

FIG. 2 shows a view in section taken along line B—B in FIG. 1,

FIG. 3 shows a partly sectional side view, and

DETAILED DESCRIPTION OF THE PREFERRED EMBODIMENTS

Figure 4:
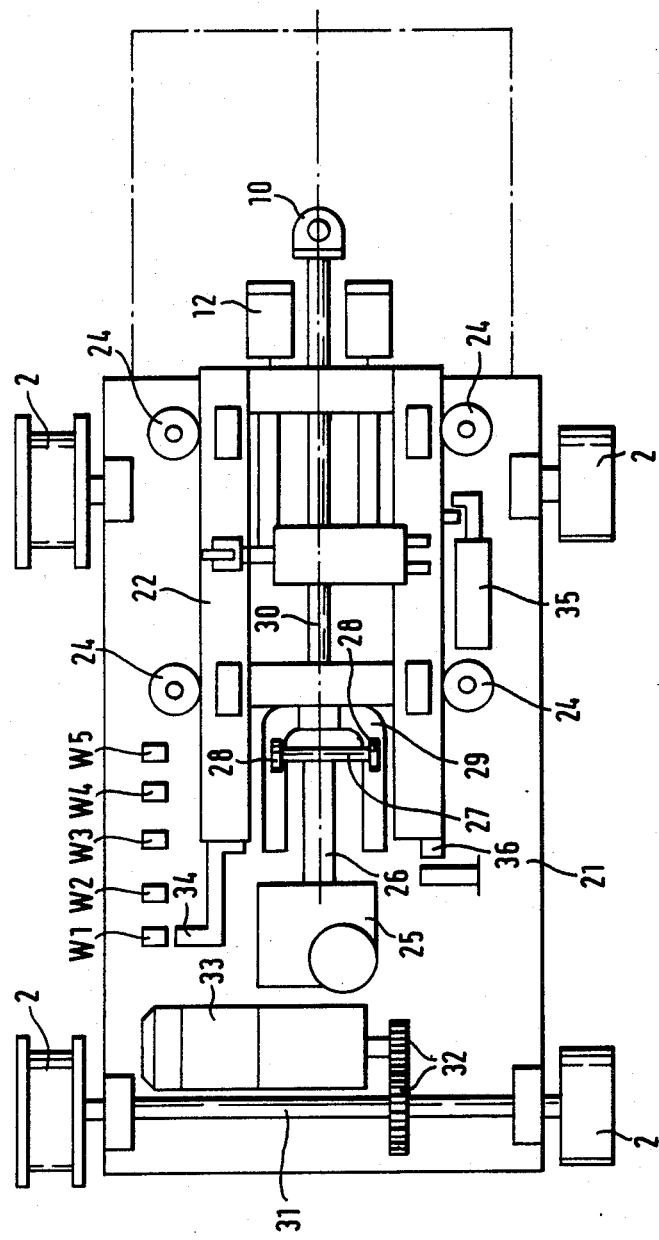
FIG. 4 shows a partly sectional top plan view.

Referring to FIG. 1, shown therein is a torch cutting machine 1 which moves by means of wheels 2 along a torch carriage track 3. The track 3 extends parallel to an elongate member or bar 4 which in the region of the torch cutting machine 1, is covered by a protective hood 5 for affording protection against heat and radiation. The protective hood 5 is secured to a holder 6 which is fixed to the main frame structure 8 of the torch cutting machine 1 by way of connecting bearers 7. In that way, the protective hood 5 is moved synchronously with the torch cutting machine 1. Provided in the protective hood 5 is an aperture 9 through which the torch 10 moves, while there is a further aperture 11 in the protective hood, through which extends a clamping lever 12 which has a clamping jaw 13 which comes to bear by means of two contact projections 14 against the elongate member 4 so that the torch cutting machine 1 is prevented from tipping.

FIG. 2 shows the way in which a contact projection 14 on the clamping jaw 13 which extends through an aperture 11 in the protective hood 5 comes to bear against the elongate member 4. The protective hood 5 shown in FIG. 2 is of a half-round configuration but it may also be of a flat or U-shaped configuration. The protective hood 5 itself is provided with insulating material and preferably has heat-reflecting properties. If necessary, the protective hood 5 may also be provided with additional means (not shown) for cooling purposes.

In order to avoid an unnecessary temperature loss in the elongate member 4, heat retaining hoods 15 are disposed at both sides of the torch cutting section, with the protective hood 5 moving therebetween in overlapping or telescopic relationship therewith, as can be seen from FIG. 1. As the protective hood 5, in the direct vicinity of the elongate member 4, provides an effective protection from heat and radiation for the entire torch cutting machine 1, the machine may be of a lightweight construction, and it is possible to forego further insulating and heat-protecting arrangements, in the torch cutting machine 1. In particular, there is no longer any need to provide a water-cooled machine housing and in other respects also a series of further advantages are achieved by virtue of the arrangement whereby a protective hood 5 is arranged on the torch cutting machine 1 in such a way as to hang down therefrom, being supported by the connecting bearers 7. It is not only possible to achieve a reduction in weight of about 50%, but in addition the center of gravity of the machine can be moved substantially downwardly. Because there is no need for a connecting shaft with bearing and coupling means, it is possible to provide a massive or solid torch mounting arrangement. Because the machine is not exposed to any thermal loadings and corresponding protective arrangements are omitted, access is substantially easier, so that maintenance is facilitated. There is no need for a drag chain and, as can be seen from FIG. 1, the supply hoses 16 can be freely guided to the torch cutting machine 1. The torch 10 may be of a comparatively short configuration and the arrangement may have a bellows-type cylinder 17 for the purposes of operating the clamping levers 12, which is prohibited if the torch cutting machine 1 is exposed to a substantial thermal loading. There is also no need for cooling of the track rails 3 and the support structure 8 which can be drastically reduced in height. Thus, it is generally possible for the height of the machine to be reduced from about 2.6 meters to 1.5 meters. Because the radiation of heat from the elongate members or bars 4 is prevented, the lateral distances between two adjacent elongate members or bars 4, with associated torch cutting machines, can also be substantially reduced.

Because of the substantial reductions in mass or weight of the torch cutting machine 1, that machine is substantially better able to follow varying speeds or varying directions of movement of the elongate member or bar 4. However, in order further to reduce the mass or weight which is exposed to acceleration or deceleration as well as a change in direction of movement by the elongate member 4, the invention further proposes, in accordance with a further embodiment shown in FIGS. 3 and 4, that the torch cutting machine 1 has a main frame structure 21 on which there is provided a clamping and cutting frame structure 22 which is displaceable with respect thereto and which, with only a low mass or weight, carries the cutting torch 10 and the clamping levers 12 as well as the clamping cylinder 23 thereof. The assembly may also include a heat-protecting board or panel member 37. The clamping and cutting frame structure 22 is mounted by means of a roller guide system 24 so that it can move relatively forwards or backwards with respect to the main frame structure 21. The torch drive means 25 comprising a motor and transmission unit is mounted on the main frame structure 21. The torch drive shaft 26 ends in a transverse bracket member 27 carrying a pair of rollers 28 which run in a cage 29. That arrangement provides a rotary connection, with respect to the torch drive shaft 30, which however permits a relative movement in the direction of the torch drive shafts 26 and 30. The main frame structure 21 is supported by its wheels 2 on the track 3, two wheels being connected by way of a drive axle 31 and associated drive gears 32 to a main frame structure drive means comprising a transmission motor unit and clutch means.

Mounted on the main frame structure 21 are proximity switches W and a suitable actuating member 34 is fixed to the clamping and cutting frame structure 22. The switches W1 and W5 serve to set the limit positions of the movement. The switches W2, W3 and W4 are control switches which can be used in conjunction with the computer for the elongate member 4 for regulating the speed of the drive motor 33 of the main frame structure 21. The clamping and cutting frame structure 22 is prevented from being pulled out by a return cylinder 35. The clamping and cutting frame structure occupies a partly advanced position after a cutting operation has been carried out, and the return cylinder 35 moves the clamping and cutting frame structure 22 back into the starting position. The clamping and cutting frame structure 22 is protected from shocks or impacts by rubber buffers 36. The return cylinder 35 is not normally connected to the clamping and cutting frame structure 22, when it is clamped to the elongate member 4.

The main frame structure 21 and the clamping and cutting frame structure 22, which are both in the form of machine carriages or slides, have their starting position in which the actuating member 34 co-operates with the switch W1, with the return cylinder 35 being in the completely retracted position.

When the machine receives a cutting signal, the torch cutting machine 1 is clamped to the elongate member or bar 4 by the clamping levers 12 being operated, and the return cylinder 35 moves into the extended position. The torch 10 is also started up. Immediately after the torch cutting machine 1 has been clamped to the elongate member 4, the clamping and cutting frame structure 22 moves, in accordance with the movement of the elongate member 4, with the main frame structure 21 still remaining in its starting position. When the switch W3 is actuated, the drive means 33 is switched on and the main frame structure 21 follows the movement of the clamping and cutting frame structure 22. When that occurs, a computer associated with the elongate member 4 may suitably control the drive means 33. If the speed of movement of the main frame structure 21 is too high and overtakes the clamping and cutting frame structure 22, the switch W2 is actuated and the speed of the main frame structure 21 is reduced until the switch W3 is actuated. If the main frame structure 21 moves too slowly, the switch W4 is actuated and the speed of the main frame structure 21 is correspondingly increased. At the end of the working operation, the clamping of the torch cutting machine 1 to the elongate member 4 by the clamping levers 12 is released and the return cylinder 35 moves the clamping and cutting frame structure 22 back into the starting position. In the event that the drive means 33 on the main frame structure 21 fails, the return cylinder 35 acts as an entrainment means, by way of which the clamping and cutting frame structure 22 also moves the main frame structure 21 or the torch carriage.

The above-described torch cutting machine permits, in a simple fashion, thermal cutting of hot, easily bendable elongate members which are conveyed horizontally at a rising and falling speed or with a varying direction of movement, wherein the spacing between two elongate members extending parallel to each other can be less than 900 mm. The heat loss at the elongate members is substantially eliminated, and the invention makes it possible to arrive at a configuration for a torch cutting machine which is not only substantially less expensive but which also reduces maintenance and, insofar as maintenance is still required, substantially facilitates same.

I claim:

1. A torch cutting machine for thermally cutting hot elongated members which bend easily and which are conveyed horizontally at varying speeds and direction of movement, said cutting machine comprising:
   a torch carriage movable longitudinally on a track parallel to the direction of travel of the elongated member, said torch carriage member including a main frame structure and a clamping and cutting frame structure;
   a torch mounted to said torch carriage;
   clamping means for selectively engaging the elongated member, said clamping means mounted to said torch carriage wherein said torch carriage is movable in conjunction with the elongated member when said clamping means are engaged with the elongated member;
   a protective hood for protecting the cutting machine from the radiating heat of the elongated member, said protective hood secured to said torch carriage and disposed beneath said torch carriage between the elongated member and the cutting machine, said hood partially enclosing the portion of the elongated member substantially beneath said torch carriage, wherein said hood includes openings through which said torch and said clamping means extend in order to engage the elongated member;
   wherein said clamping and cutting frame structure includes separate drive means for drivably moving said clamping and cutting frame structure in relation to said main frame structure.

2. The cutting machine as defined in claim 1 wherein said torch, said clamping means and said protective hood are secured to said clamping and cutting frame structure to move synchronously therewith.

3. The cutting machine as defined in claim 1 and further comprising stationary heat retaining hoods disposed forwardly and rearwardly of said torch carriage, wherein said protective hood is movably displaced in a telescopically overlapping relationship with said heat retaining hoods as said torch carriage moves along said track.

4. The cutting machine as defined in claim 1 wherein said protective hood is substantially planar.

5. The cutting machine as defined in claim 4 wherein said protective hood is substantially semi-cylindrical.

6. The cutting machine as defined in claim 5 wherein said protective hood has a substantially U-shaped cross-section.

7. The cutting machine as defined in claim 6 wherein said protective hood includes insulating material and has heat reflecting properties.

8. The cutting machine as defined in claim 2 said clamping and cutting frame structure is mounted on said main-frame structure.

9. The cutting machine as defined in claim 8 wherein said main frame structure includes drive means controlled by a plurality of proximity switches, said drive means driving said main frame structure along said track in conjunction with the elongated member.

10. The cutting machine as defined in claim 9 wherein mounted to said main frame structure are entrainment means for moving said clamping and cutting frame structure if said main frame drive means fails.

11. The cutting machine as defined in claim 2 wherein said clamping means comprises a pair of clamping levers having two contact points each, said clamping levers engaging the elongated member on opposite sides of the elongated member in order to prevent the cutting machine from tilting.

12. The cutting machine as defined in claim 1 wherein the lower part of said torch which extends through said protective hood is water cooled.

13. The cutting machine as defined in claim 11 wherein said clamping levers are controlled by a bellows cylinder unit.

* * * * *